(12) United States Patent
O'Donnell et al.

(10) Patent No.: US 12,630,069 B1
(45) Date of Patent: May 19, 2026

(54) AUTONOMOUS PNEUMATIC ENCLOSING CLASP

(71) Applicant: The United States of America as represented by the Secretary of the Navy, Newport, RI (US)

(72) Inventors: Jacob D O'Donnell, Middletown, RI (US); Nicholas A Valm, Dartmouth, MA (US); Michael P Smith, Warwick, RI (US); Paul V Cavallaro, Raynham, MA (US)

(73) Assignee: The United States of America as represented by the Secretary of the Navy

( * ) Notice: Subject to any disclaimer, the term of this patent is extended or adjusted under 35 U.S.C. 154(b) by 364 days.

(21) Appl. No.: 18/242,265

(22) Filed: Sep. 5, 2023

(51) Int. Cl.
B60P 7/08 (2006.01)
B63B 25/24 (2006.01)

(52) U.S. Cl.
CPC ............... B60P 7/08 (2013.01); B63B 25/24 (2013.01)

(58) Field of Classification Search
CPC ..... B63B 25/24; B63B 2025/285; B63B 7/08; B60P 7/065; B60P 7/16; B65D 81/052
USPC ................... 410/96; 206/522, 583, 590–599; 428/178
See application file for complete search history.

(56) References Cited

U.S. PATENT DOCUMENTS

| | | | | |
|---|---|---|---|---|
| 5,624,035 A * | 4/1997 | Kim | .................... | B65D 81/052 206/592 |
| 7,299,925 B1 * | 11/2007 | Ansay | .................. | B65D 81/052 206/583 |
| 7,717,381 B2 * | 5/2010 | Fontana | ................. | A63B 29/00 254/242 |
| 8,157,096 B2 * | 4/2012 | Liao | ..................... | B65D 81/052 383/3 |
| 8,272,822 B2 * | 9/2012 | Casazza | .................. | F03D 13/40 410/155 |
| 8,319,630 B1 * | 11/2012 | Salwan | .................. | A45C 15/06 383/61.3 |
| 8,936,156 B1 * | 1/2015 | Tschantz | .............. | B65D 81/052 206/522 |
| 11,371,576 B2 * | 6/2022 | Clayton | .................... | F41H 3/00 |
| 11,820,276 B2 * | 11/2023 | Farmer | .............. | A01M 13/003 |
| 12,378,056 B2 * | 8/2025 | Borrero | .................. | B65D 81/03 |

* cited by examiner

*Primary Examiner* — Amy R Weisberg
*Assistant Examiner* — Philip C Adams
(74) *Attorney, Agent, or Firm* — James M. Kasischke; Jeffry C. Severson

(57) ABSTRACT

A pneumatic enclosure assembly is provided for securing a payload. The pneumatic enclosure assembly includes a cover, inflatable arches, and at least one pneumatic actuator. The cover attached to a base at a first end and second end, and the inflatable arches and at least one pneumatic actuator are positioned entirely within the cover, the at least one pneumatic actuator arranged parallel to the inflatable arches.

20 Claims, 2 Drawing Sheets

AUTONOMOUS PNEUMATIC ENCLOSING CLASP

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER APPLICATIONS

None.

BACKGROUND OF THE INVENTION

(1) Field of the Invention

The present invention is a system and method for automatically securing a payload to a surface using a combination of inflatable arches and pneumatic actuators.

(2) Description of the Related Art

A delivery vehicle such as a ship or truck may be tasked with transporting a payload which is secured to a base. Attaching the payload to the base includes securing the payload against vibrations, wind, mechanical shock, and the like to which the payload may be exposed during transportation. Conventionally, an operator is tasked with loading, unloading, and securing the payload to the base. However, such operations, especially during rough environmental conditions, may be hazardous to the operator. Further, the operator conventionally secures the payload by tightening straps and may inadvertently make a strap tight enough that force applied by the strap damages the payload. There is a demand for autonomous systems and methods for securing the payload without any direct intervention from an operator which also control the amount of force exerted on the payload.

BRIEF SUMMARY OF THE INVENTION

Accordingly, it is a primary object and general purpose of the present invention to provide a system and method for autonomously securing a payload to a base using a pneumatic enclosure assembly. In this way the payload, such as a drone or unmanned underwater vehicle (UUV), may be secured against unwanted movement or vibrations without hands-on intervention of an operator.

To attain the present invention, a pneumatic enclosure assembly is disclosed. The pneumatic enclosure assembly includes a cover, inflatable arches, at least one pneumatic actuator, and a base. The inflatable arches and the at least one pneumatic actuator are completely surrounded by the cover and the cover is reversibly coupled to the base. The inflatable arches and the at least one pneumatic actuator are arranged side by side within the cover in an alternating fashion. The pneumatic enclosure assembly may be in a storage state, open state or closed state. In the storage state, both inflatable arches and pneumatic actuators are deflated. When the pneumatic enclosure assembly is in an open state, the inflatable arches are inflated and the at least one pneumatic actuator is deflated. In an open state, the payload can be moved freely into or out of the pneumatic enclosure. When the pneumatic enclosure assembly is in a closed state, the inflatable arches are deflated and the at least one pneumatic actuator are inflated. In the closed state, the at least one pneumatic actuator decreases in length and widens diametrically to clamp down and secure the payload to the base, thereby protecting the payload against shocks and vibrations.

Further, the pneumatic enclosure assembly includes a pump system and a controller. The pump system is fluidly coupled to the inflatable arches and the at least one pneumatic actuator and communicatively coupled to the controller. The controller includes instructions stored on nonvolatile memory to activate the pump system to inflate or deflate the inflatable arches and pneumatic actuators according to a desired state of the pneumatic enclosure.

An advantage of the present invention is the payload is secured without demanding physical intervention of an operator.

In this way, operator safety is increased. Further, the pneumatic enclosure assembly enables a small storage volume for the payload and a clasping force of the pneumatic enclosure assembly against the payload can be accurately controlled.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DETAILED DESCRIPTION OF THE INVENTION

Figure 1:
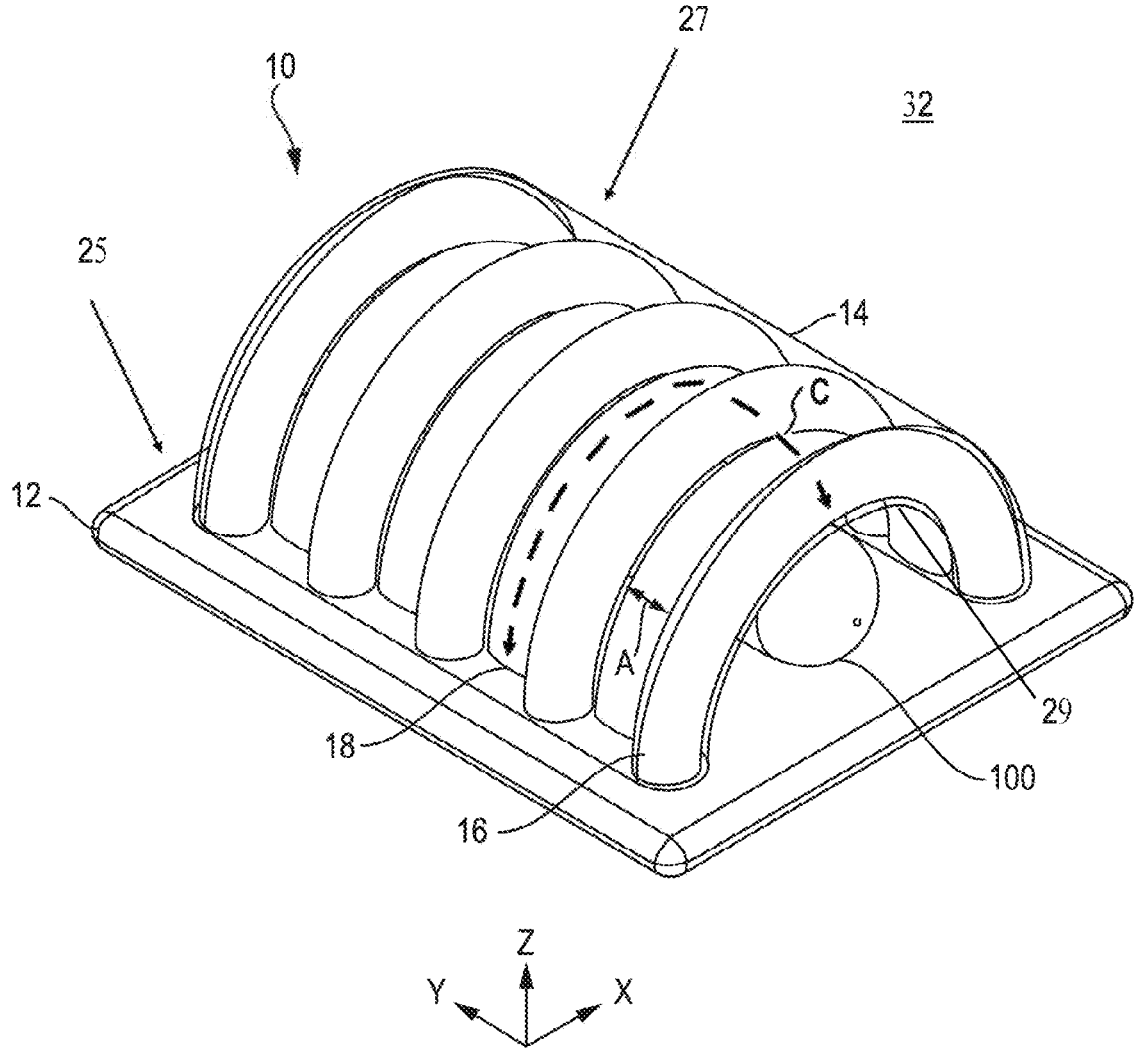
FIG. 1 depicts an illustration of a pneumatic enclosure assembly an open state.
Figure 2:
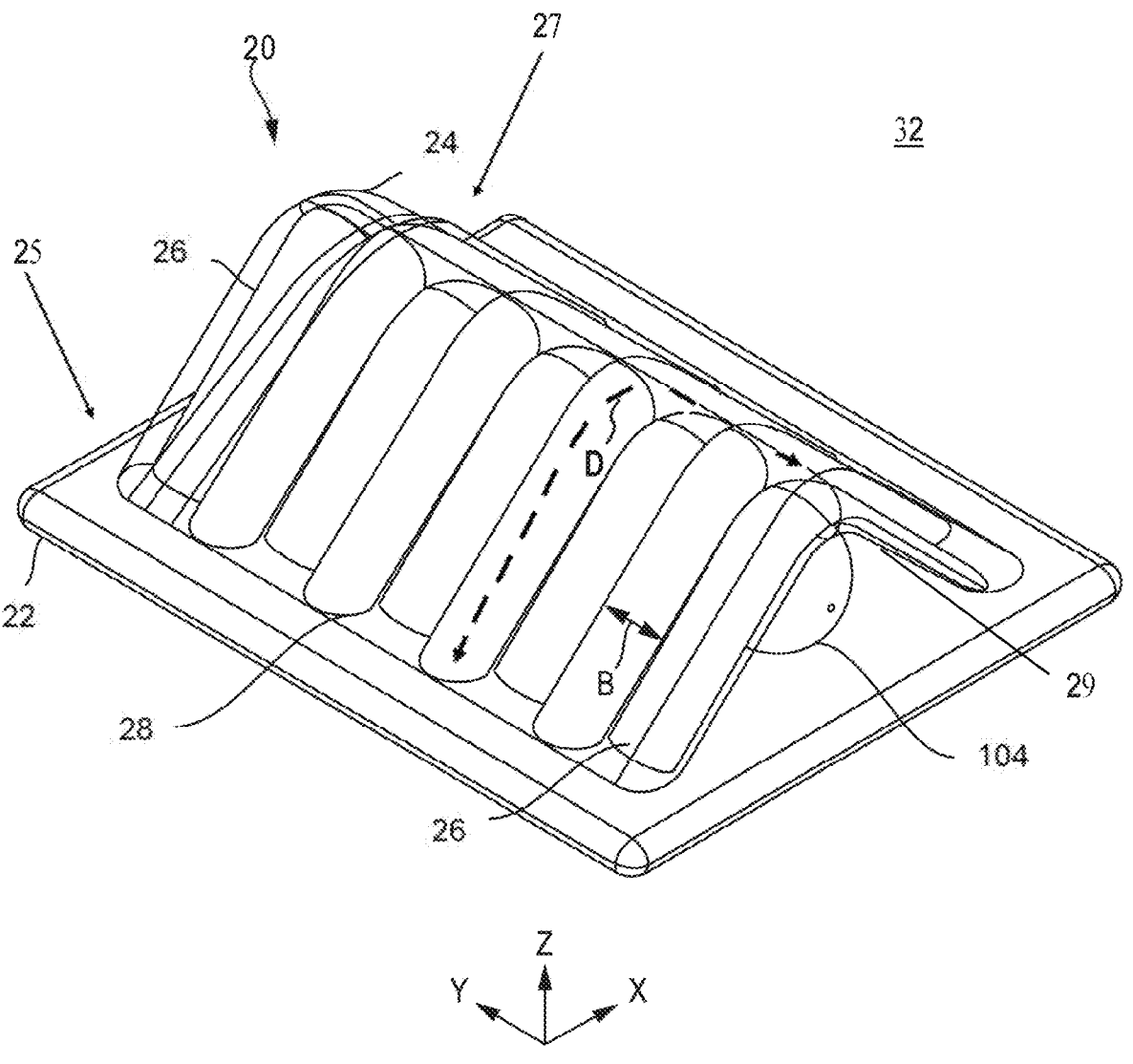
FIG. 2 depicts an illustration of the pneumatic enclosure assembly in a closed state.

An example of pneumatic enclosure assembly 10 is shown in FIGS. 1-2. FIG. 1 shows pneumatic enclosure assembly 10 in an open state and FIG. 2 shows pneumatic enclosure assembly 10 in a closed state. A reference axis 102 is provided including an x-axis parallel to a longitudinal axis, a y-axis parallel to a lateral axis, and a z-axis perpendicular to both the x-axis and the y-axis.

Pneumatic enclosure assembly 10 may be positioned on a vehicle to be transported between locations. As non-limiting examples, the vehicle may be a ship, truck, or cargo plane. Additionally, pneumatic enclosure assembly 10 may be tethered to and towed by the vehicle.

Pneumatic enclosure assembly 10 includes a pneumatic enclosure 20, a base 22, a cover 24, a pump system and a controller. Pneumatic enclosure 20 includes inflatable arches 26, and at least one pneumatic actuator 28.

The pump system includes at least one pump and a manifold. The at least one pump is fluidly coupled to the inflatable arches 26 and the at least one pneumatic actuator 28 via the manifold. In one example, the at least one pump may be an air compressor configured to pump air into and out of both the inflatable arches 26 and the at least one pneumatic actuator 28. Additionally or alternatively, the at least one pump may include a liquid pump configured to pump seawater into and out of the inflatable arches 26 and the at least one pneumatic actuator 28. Additionally, the at least one pump may include a gas cylinder pre-filled with compressed air. The manifold includes a series of valves and fluid passages to control flow of air and/or water into and out of the inflatable arches 26 and the at least one pneumatic actuator 28. In one example, the manifold includes check valves to ensure that a loss of pressure of one of the inflatable arches or the at least one pneumatic actuator does not cause a loss of pressure throughout pneumatic enclosure 20. A controller is used to control the pump system to inflate and deflate the inflatable arches 26 and the at least one pneumatic actuator 28.

The at least one pneumatic actuator 28 of pneumatic enclosure 20 is an artificial soft fabric muscle (ASFM). The ASFM includes a body positioned longitudinally between a first seal and a second seal. The body is formed of a cylindrical fabric sleeve which completely circumferentially surrounds a cylindrical flexible non-structural membrane (e.g., membrane). The cylindrical fabric sleeve is formed of a braided fabric which is anisotropic and comprised of non-orthogonal fibers. The membrane is formed of a thin elastomer. The body further includes a valve fluidly coupled to the membrane and protruding through the cylindrical fabric sleeve.

In the deflated state, the body is a deflated longitudinal length and a deflated lateral (e.g., diametrical) width. When the membrane is filled with air through a valve, the ASFM transitions to an inflated state. In the inflated state, the body is an inflated longitudinal length and an inflated lateral width. The deflated longitudinal length is longer than inflated longitudinal length and deflated lateral width is shorter than inflated lateral width. Said another way, the ASFM contracts longitudinally and expands laterally (e.g., diametrically) when transitioning from the deflated state to the inflated state. An extent of contraction and expansion and a force generated by the ASFM is proportional to an air pressure within the ASFM and can be predicted based on known relationships. Maximum dimensions of the membrane are chosen to be larger than the deflated longitudinal length and the inflated lateral width.

Dimensions of base 22 of pneumatic enclosure assembly 10 are chosen according to dimensions of a payload 104 as well as desired operating conditions of pneumatic enclosure assembly 10. In some embodiments, base 22 may be a deck, floor, wall, or other surface of a vessel. Base 22 may be a rigid material or base 22 may be flexible and inflatable. An orientation of pneumatic enclosure assembly 10 does not depend on a direction of gravity. For example, base 22 may be oriented parallel to a wall or base 22 may be floating on water and be oriented so that cover 24 is under the water. Further, pneumatic enclosure assembly 10 may be used when submerged under water.

Inflatable arches 26 and at the least one pneumatic actuator 28 are operably coupled to cover 24. In an exemplary embodiment, inflatable arches 26 and the at least one pneumatic actuator 28 are positioned entirely within and surrounded by cover 24. Cover 24 is formed of a flexible fabric and is soft and deformable. A first end of cover 24 and a second end of cover 24 are both reversibly coupled (e.g., able to be decoupled without damage to cover 24 or base 22) to base 22. The first end of cover 24 is longitudinally opposite the second end of cover 24 across the x-axis. Cover 24 may be reversibly coupled to base 22 by soft good to soft good connections such as zippers, hook and loop fabric connections, or soft good to hard good connections. A third end of cover 24 and a fourth end of cover 24 are not attached to base 22. The third end of cover 24 and fourth end of cover 24 are positioned opposite of each other laterally across the y-axis and perpendicular to the first and second end of cover 24. The third section and fourth ends of cover 24 are spaced away from base 22 when pneumatic enclosure assembly 10 is in either the open state or the closed state.

Inflatable arches 26 are formed of cylinders of flexible material. When inflated, inflatable arches 26 form an arch shape. Inflatable arches 26 are not ASFMs and do not include membranes. In some embodiments, inflatable arches may be formed of drop stitch panels.

The longitudinal lengths of outer inflatable arches 26 and at least one pneumatic actuator 28 when laid flat and deflated are longer than a distance between the first edge of cover 24 and the second edge of cover 24. In this way, when inflatable arches 26 are inflated, inflatable arches 26 assume an arch shape and cover 24 surrounding inflatable arches 26 also assumes an arch shape.

Inflatable arches 26 and the at least one pneumatic actuator 28 are arranged parallel to each other in an alternating pattern within cover 24. At least one pneumatic actuator 28 is positioned between inflatable arches 26 so that two lateral edges of at least one pneumatic actuator 28 are each aligned parallel to a lateral edge of one of inflatable arches 26. First and second longitudinal ends inflatable arches 26 and the first and second longitudinal ends of the at least one pneumatic actuator 28 are physically coupled to the first and second ends of cover 24. In some examples, inflatable arches 26 and at least one pneumatic actuator 28 are not physically coupled to each other.

A number and size of inflatable arches 26 and the at least one pneumatic actuator 28 comprising pneumatic enclosure 20 may depend on dimensions of the payload being secured. A number of inflatable arches is one more than a number of the at least one pneumatic actuator 28. Inflatable arches 26 and the at least one pneumatic actuator 28 are arranged such that inflatable arches 26 are positioned at outermost lateral edges of pneumatic enclosure 20. In this way, the outermost inflatable arches create an open area for the payload to move into and out of pneumatic enclosure assembly 10.

In the open state, inflatable arches 26 are inflated and the at least one pneumatic actuator 28 is deflated. The deflated at least one pneumatic actuator 28 is a deflated longitudinal length forming an arch shape as dictated by inflatable arches 26 and a deflated lateral width (e.g., diameter) a. Inflatable arches 26 may be inflated with air or seawater supplied by the pump system. Inflated inflatable arches 26 force cover 24 and deflated pneumatic actuators in an arch shape. In this way, payload 104 is moved freely into and out of pneumatic enclosure 20. In the open state, payload 104 may rest on base 22 and be underneath but spaced away from cover 24. In an example where inflatable arches 26 are inflated with water, pneumatic enclosure assembly 10 may be used underwater and payload 104 may be moved into and out of pneumatic enclosure 20 while under water.

Turning now to FIG. 2, pneumatic enclosure assembly 10 is shown in the closed state. In the closed state at the least one pneumatic actuator 28 is inflated and inflatable arches 26 are deflated. Inflating the at least one pneumatic actuator 28 causes the at least one pneumatic actuator 28 to increase in height diametrically to inflated lateral width b and decrease in longitudinal length. The at least one pneumatic actuator 28 is secured at opposing longitudinal ends to the first and second ends of cover 24 which is in turn secured to base 22. Inflating causes pneumatic enclosure 20 to deform from the arch shape as pneumatic actuator 28 contracts from a first deflated longitudinal length to the second inflated length, changing from an arch shape to a tend like shape, and a clasping force is exerted against payload 104 (e.g., deflated length a and inflated length c of FIGS. 3-4). Further, the clasping force is generated against payload 104 by the increasing diameter of the at least one pneumatic actuator 28 from the first deflated width to the second inflated width (e.g., first deflated width b and second inflated width d of FIGS. 3-4). The clasping force exerted by the decreasing length and increasing diameter of the at least one pneumatic actuator 28 is responsible for holding payload 104 against base 22. Because the at least one pneumatic actuator 28 is flexible, pneumatic enclosure 20 deforms around a shape of the payload without causing additional stress to the payload which may dent or otherwise degrade the payload.

A change in dimensions when inflating the at least one pneumatic actuator 28 is controlled by controlling an inflation pressure via the controller. Further, the clasping force exerted by the at least one pneumatic actuator 28 on the payload cannot exceed the inflation pressure. By controlling the inflation pressure, the clasping force can be tailored according to the payload being secured. The change in dimensions also depends on the initial dimensions of the at least one pneumatic actuator 28. Dimensions of the pneumatic actuator 28 are chosen based on a size of the payload to be secured by pneumatic enclosure 20. The pneumatic actuators can hold the payload in place in an air or aquatic environment, provide buoyancy to pneumatic enclosure 20 and survive severe shocks such as underwater explosions.

In some embodiments, an inside face of cover 24 (e.g., a face which contacts the payload when the pneumatic enclosure is in the closed state) may be coated with an increased friction coefficient material, such as a sanded polymer paint. The increased friction coefficient cover may be designed to clasp the payload more securely when the payload is large enough that it does not fit entirely underneath cover 24.

Pneumatic enclosure assembly 10 is stored in a storage state when not being used to secure a payload. In the storage state, both inflatable arches 26 and the at least one pneumatic actuator 28 are fully deflated. In this way, a size of pneumatic enclosure assembly 10 is minimized when not being used.

In anticipation of receiving a payload, the pneumatic enclosure assembly transitions from the storage state to the open state. To transition from the storage state to the open state, the pump system inflates the inflatable arches while keeping the at least one pneumatic actuator 28 deflated.

Once payload 104 is received and is positioned between cover 24 and base 22, pneumatic enclosure assembly 10 transitions to the closed state. To transition from the open state to the closed state, inflatable arches 26 are deflated and the at least one pneumatic actuator 28 is inflated. The air and/or water inflating the inflatable arches may be pumped into the at least one pneumatic actuator by the pump system. Additionally, the pump system may fully deflate inflatable arches 26 and then pump air and/or water into the at least one pneumatic actuator 28. The at least one pneumatic actuator 28 may be inflating while the inflatable arches 26 are deflating. The at least one pneumatic actuator 28 and the inflatable arches 26 are not both in a fully inflated state at the same time. Transitioning to the closed state causes cover 24 to transition from an arch shape to a second shape which is partially conformed to a shape of payload 104.

When movement of payload 104 out of pneumatic enclosure 20 is demanded, pneumatic enclosure assembly 10 transitions back to the open state, following a reverse process of transition from the open state to the closed state. The at least one pneumatic actuator 28 is deflated and the inflatable arches are inflated. In some examples, the air/water from the at least one pneumatic arch may be pumped into the inflatable arches.

In this way pneumatic enclosure assembly 10 autonomously and reversibly secures payload 104 while an operator remains at a safe distance and is not physically touching pneumatic enclosure 20. The pneumatic enclosure assembly also controls a force exerted against payload 104, thereby preventing denting or other damage payload 104 which would be caused by excessive force.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A pneumatic enclosure assembly, comprising:
a cover attached to a base at a first end and a second end, said first end longitudinally opposite said second end;
inflatable arches operably coupled to said cover, said inflatable arches positioned with a longitudinal axis of said inflatable arches perpendicular to said first end of the cover and said second end of the cover; and
at least one pneumatic actuator positioned within said cover and between and parallel to said inflatable arches;
wherein the inflatable arches and the at least one pneumatic actuator are configured to inversely inflate and deflate.

2. The assembly in accordance with claim 1, wherein said base is inflatable.

3. The assembly in accordance with claim 1, wherein an inner surface of said cover facing said base is coated with an increased friction coefficient material.

4. The assembly in accordance with claim 1, wherein the at least one pneumatic actuator is an artificial soft fabric muscle.

5. The assembly in accordance with claim 1, wherein a first and a second longitudinal end of said inflatable arches and a first and second longitudinal end of said at least one pneumatic actuator are each physically coupled to the cover.

6. The assembly in accordance with claim 1, a number of said inflatable arches is one more than a number of said at least one pneumatic actuators.

7. The assembly in accordance with claim 1, wherein the at least one pneumatic actuator is a deflated longitudinal length and a deflated lateral width when deflated and an inflated longitudinal length and inflated lateral width when inflated, and wherein the deflated longitudinal length is longer than the deflated longitudinal length and the deflated lateral width is shorter than the inflated lateral width.

8. A method for securing a payload, comprising:
coupling a cover of a pneumatic enclosure assembly to a base of said pneumatic enclosure assembly, said cover operably coupled to inflatable arches and at least one pneumatic actuator positioned between said inflatable arches;
inflating said inflatable arches wherein said pneumatic enclosure assembly is in an open state;
positioning the payload between said base and said cover; and
deflating said inflatable arches and inflating said at least one pneumatic actuator wherein said pneumatic enclosure assembly is in a closed state.

9. The method in accordance with claim 8, wherein inflating and deflating is done without an operator physically touching said pneumatic enclosure assembly.

10. The method in accordance with claim 8, wherein positioning the payload between said base and said cover is done while said pneumatic enclosure assembly is under water.

11. The method in accordance with claim 8, further comprising deflating said inflatable arches and said at least one pneumatic actuator wherein said pneumatic enclosure assembly is in a storage state.

12. The method in accordance with claim 8, wherein inflating said at least one pneumatic actuator includes transferring air from said inflatable arches to said at least one pneumatic actuator.

13. The method in accordance with claim 8, wherein inflating said at least one pneumatic actuator increases a diameter and decrease a length of said at least one pneumatic actuator.

14. The method in accordance with claim 8, wherein inflating said at least one pneumatic actuator includes inflating said at least one pneumatic actuator to a pressure corresponding to a desired clasping force.

15. A pneumatic enclosure assembly for securing a payload, comprising:

a pneumatic enclosure including inflatable arches and at least one pneumatic actuator, wherein said pneumatic enclosure is shaped as an arch when said pneumatic enclosure assembly is in an open state, and when said pneumatic enclosure assembly is in a closed state, said pneumatic assembly is shaped to at least partially conform to a shape of the payload.

16. The assembly in accordance with claim 15, wherein the payload is positioned between said pneumatic enclosure and a base.

17. The assembly in accordance with claim 15, wherein the arch is formed by said inflatable arches.

18. The assembly in accordance with claim 15, wherein the shape of the pneumatic enclosure in the closed state is formed by said at least one pneumatic actuator.

19. The assembly in accordance with claim 15, wherein in the open state, said inflatable arches are at least partially filled with water.

20. The assembly in accordance with claim 15, wherein in the closed state said at least one pneumatic actuator is at least partially filled with water.

\* \* \* \* \*